United States Patent [19]

Russell

[11] Patent Number: 4,468,714

[45] Date of Patent: Aug. 28, 1984

[54] ZONE SELECTIVE INTERLOCK MODULE FOR USE WITH STATIC TRIP CIRCUIT BREAKERS

[75] Inventor: Ronald R. Russell, Plainville, Conn.

[73] Assignee: General Electric Company, New York, N.Y.

[21] Appl. No.: 438,203

[22] Filed: Nov. 1, 1982

[51] Int. Cl.³ .................. H02H 3/00; H02H 7/00; H02H 3/20; G01R 27/00

[52] U.S. Cl. .................... 361/62; 361/66; 340/825.02; 340/825.06; 324/424

[58] Field of Search ............ 340/661, 825.02, 825.06, 340/825.12, 825.16; 361/62, 64, 66, 68, 86, 104, 67, 82, 69; 324/418, 424

[56] References Cited

U.S. PATENT DOCUMENTS

| | | | |
|---|---|---|---|
| 3,070,728 | 12/1962 | Edmunds | 361/104 X |
| 3,383,562 | 5/1968 | Fuller et al. | 361/62 X |
| 3,686,531 | 8/1972 | Decker et al. | 361/64 |

Primary Examiner—E. A. Goldberg
Assistant Examiner—Patrick W. Foster
Attorney, Agent, or Firm—R. A. Menelly; W. C. Bernkopf; Fred Jacob

[57] ABSTRACT

A zone selective interlock module is interposed between a pair of upstream and downstream static trip circuit breakers for controlling the short-time and ground fault zone selective interlock functions of the breakers. When a signal is received from a downstream static trip breaker, the module transmits a low-level interlock signal to a static trip breaker upstream. The interlock signal, in turn, activates the programmer circuit of the upstream breaker causing a shift in the upstream programmer time delay characteristics. The module also provides an energy storage feature to ensure the integrity of the interlock function in the event that the control power is lost upon the occurrence of a fault.

15 Claims, 2 Drawing Figures

ZONE SELECTIVE INTERLOCK MODULE FOR USE WITH STATIC TRIP CIRCUIT BREAKERS

BACKGROUND OF THE INVENTION

The invention relates in general to the selective coordination between two or more circuit protective devices upon the occurrence of a fault, and more particularly, to a module for providing zone selective interlock features between interconnected static trip circuit breakers.

U.S. Pat. No. 4,245,318 to Eckart et al., assigned to the common assignee of the instant invention, describes the relationship between time and current for static trip circuit protective devices. This patent is incorporated herein for purposes of reference.

Manufacturers of circuit protective devices, e.g. circuit breakers, fuses, overload relays, etc., provide log-log coordinate graphs of the response time versus current curves for their devices. In the case of a circuit breaker, for example, its response time versus current curve, typically referred to as a trip-time curve, indicates the time in which the breaker will trip in response to a particular level of overcurrent. Thus, if the overcurrent is of sustained overload proportions, the circuit breaker's trip-time curve shows that it will trip within a prescribed time determined by the overcurrent magnitude. Overload tripping is typically performed on an inverse-time basis, i.e. the larger the over-load current, the less time to trip, and vice versa. Circuit breakers are designed to trip on this basis so as not to trip in response to normal momentary overload currents which flow, for example, during motor starting. Overload current responses of fuses and overload relays are also predicated on an inverse-time basis. Circuit protective devices, including circuit breakers, are also designed to respond to overcurrents of short circuit proportions, e.g., ten times rated current, on an instantaneous basis, that is, without intentional delay. A typical circuit breaker clearing time, i.e., the maximum time taken by the breaker to physically open its contacts and interrupt short circuit currents, is typically twenty-five to thirty milliseconds.

Intermediate to the overload and short circuit overcurrent ranges is a heavy overload current range, e.g., three to ten times rated current, which is typically handled on a fixed time delay basis. That is, circuit interruption in response to heavy overload current levels is effected upon the expiration of a predetermined fixed short time delay.

Once an electrical power distribution system has been designed, its loads and operating conditions defined, and the voltages and electrical equipment selected, it remains to determine the appropriate circuit protective devices to be used. The primary concern in this determination is protection of the distribution system in the event of a fault precipitating abnormal overcurrent condition, i.e., to prevent or at least minimize damage to the system, including its conductors and connected loads. Such a fault may be caused by equipment failure, human error, or emergencies of natural origin. Typically, such faults are unpredictable, and thus the selected circuit protective devices must function automatically to fully protect the system, and incidentally to protect personnel and property against the consequential hazards of such faults.

Another principal concern associated with the determination of the circuit protective devices to be used is to minimize the extent and duration of electrical service interruption in the event of a fault. In all but the simplest systems, there are two or more circuit protective devices between a fault and the source of the fault current. In order to minimize electrical service interruption these protective devices should be selective in response such that the one nearest the fault will first attempt to interrupt the fault current. If, for any reason, this protective devices does not clear the fault in timely fashion, the next upstream protective device will attempt to do so, and so on. This response selectivity is termed system selective coordination. To achieve such coordination the protective devices must be chosen on the basis of their particular response time-current characteristics so as to operate on the minimum current that will enable them to distinguish between fault currents and permissable, short term load currents in excess of rated current. Each device should operate in the minimum time possible and yet be selective, i.e., coordinate, with other devices in series therewith. When these two requirements are met, damage to the system and service interruption are minimized.

It is thus appreciated that the concerns of the adequate distribution system protection and coordination involved in the selection of the appropriate circuit protective devices to be implemented requires a complete understanding of the response time-current curves of the numerous types and kinds of circuit protective devices available. For it is on the basis of these curves that the circuit protective device selections are made pursuant to achieving requisite system protection and coordination on the most economically practical basis.

U.S. Pat. No. 4,266,259 to Howell also assigned to the assignee of the instant invention, describes a static trip circuit breaker which includes provision for zone selective interlocking functions. This patent is incorporated herein for purposes of reference. The patent is particularly useful in providing a detailed description of the operation of the circuit components to provide time-trip characteristics for various current magnitudes.

SUMMARY OF THE INVENTION

The zone selective interlock module of the invention is an intermediate control device used between upstream and downstream static trip circuit breakers to provide short-time and ground fault zone selective interlock functions. A plurality of voltage comparators are employed for activating an electronic switch when an input signal from a downstream breaker reduces the voltage below the reference voltage of any of the comparators. An output voltage is provided to a corresponding upstream breaker in order to increase the delay of the upstream breaker. A corresponding plurality of window detectors are connected to the output terminals of the module which provide the output voltage to the upstream circuit breakers. An LED becomes illuminated whenever any of the comparators become enabled to provide an indication that a fault has occurred and that the pickup time of an upsteam breaker is being delayed. An energy storage network consisting of an energy storage capacitor provides operational power to the module in the event that a power failure occurs during the time that the module is functioning to provide a time delay to an upstream breaker.

DESCRIPTION OF THE PREFERRED EMBDIMENT

Figure 1:
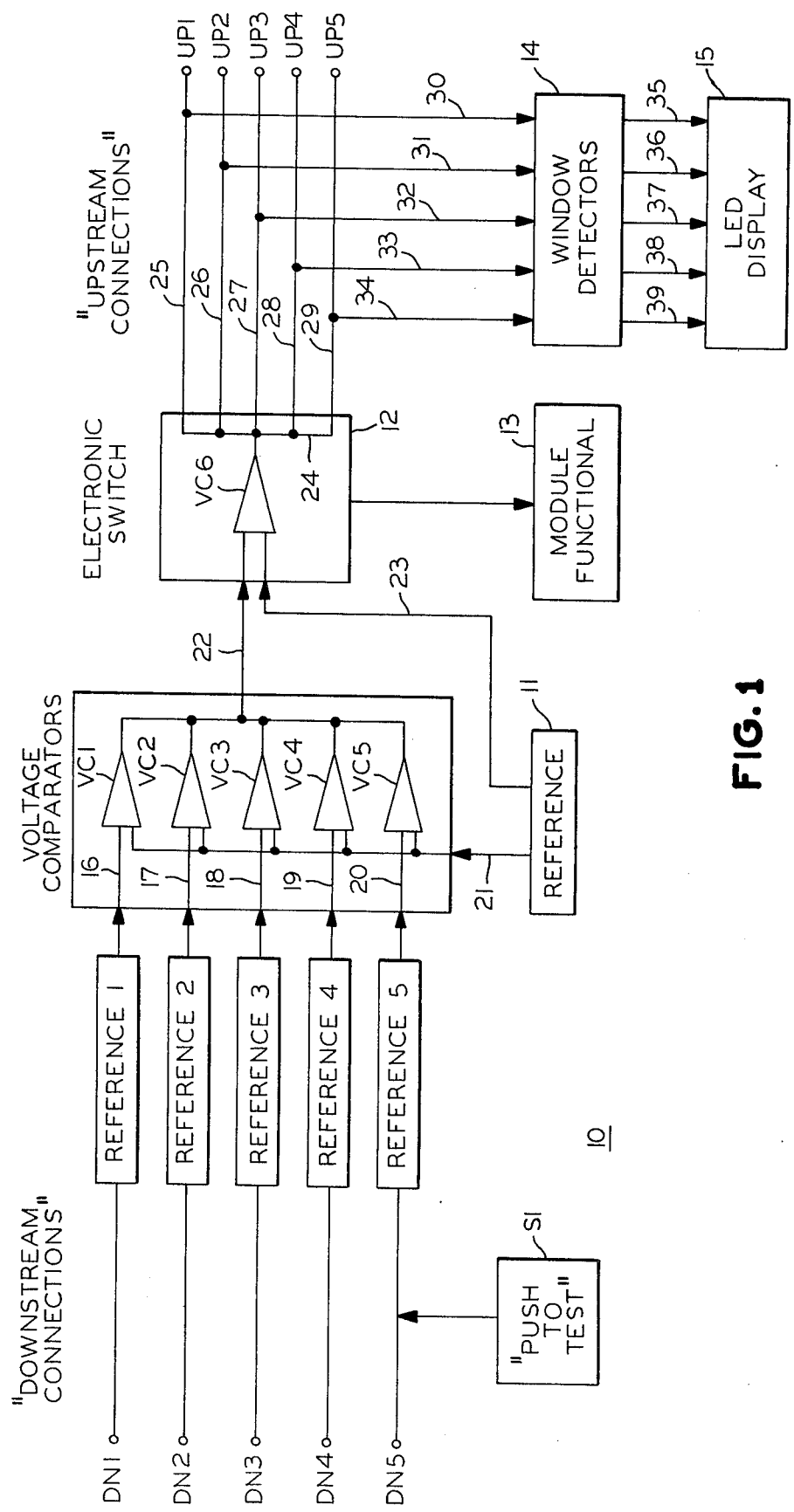
FIG. 1 is a block diagram representation of the zone selective interlock module according to the invention.

FIG. 1 shows a zone selective interlock module circuit 10 for use with the static trip unit described earlier in the Patent to Howell and which contains five "downstream connections" DN1-DN5 for connecting to a corresponding number of static trip circuit breakers on the load side of the module. A voltage is acted upon by the corresponding static trip breaker through an associated reference circuit REF1-REF5 to one input of a corresponding number of voltage comparators VC1-VC5 which can be operational amplifiers. A reference voltage is applied from reference source 11 through common lead 21 to one input of each of the comparators. The other input to the comparators is connected to the reference circuits by means of leads 16-20 respectively. A common output lead 22 inputs one voltage signal to a voltage comparator VC6 within electronic switch 12 for comparison to a reference voltage supplied to the other input of VC6 via lead 23. As described in the aforementioned Patent to Howell, the occurrence of a fault within the protected load in one of the downstream static breakers results of a "zero" output signal voltage on one of the downstream connections connected with the particular static breaker. The absence of a voltage signal on downstream terminal DN1 for example, causes an imbalance to occur between the inputs to VC1 and results in the occurrence of an output signal on lead 22 causing electronic switch 12 to become enabled. An output voltage from VC6 via lead 24 causes a voltage to appear on each of the upstream connections UP1-UP5 via leads 25-29 respectively. A voltage signal also occurs on each of a plurality of inputs to window detectors 14 via corresponding leads 30-34. The window detectors determine the "impedance window" of the upstream breakers. LED display 15 becomes illuminated by connection with leads 35-39 to indicate the occurrence of a fault on one of the downstream breakers. The voltage signal is applied to upstream connections UP1-UP5 causes each of the corresponding upstream static breakers to shift to a longer time delay for their short-time and ground fault trip settings. This feature therefore allows the downstream breaker closest to the fault to trip in a sufficient time interval before any of the upstream breakers. The use of an LED display to indicate the occurrence of a fault on a downstream breaker and a shift in the time delay characteristics of an upstream breaker, is an important feature of this invention. A similar plurality of window detectors and LED display could be connected to the downstream terminals DN1-DN5 in order to indicate which of the downstream breakers is experiencing a fault, if so desired. Operating test switch S1, in the absence of a fault on the downstream terminals results in the occurrence of a "zero" voltage at the output of REF5 on lead 20 enabling VC5 with a resulting output voltage VC6 to illuminate LED display 15 to provide an indication that the module circuit is operative. Alternatively, an LED display can be included within the module functional display 13 to indicate that the module circuit is functional when push to test switch S1 is depressed. The "impedance window" is the range in impedance which indicates the absence of a short circuit or open circuit in the connection between the module and any of the upstream breakers as well as the absence of any high resistance connection within the breaker itself. A typical window value which includes the breaker impedance and the impedance of the connecting wires is in the range of from roughly 300 to 700 ohms. When the test button is pushed, the LED display will see an operational voltage only if the aforementioned impedance lies within the window.

DOWNSTREAM AND UPSTREAM TERMINALS

Figure 2A:
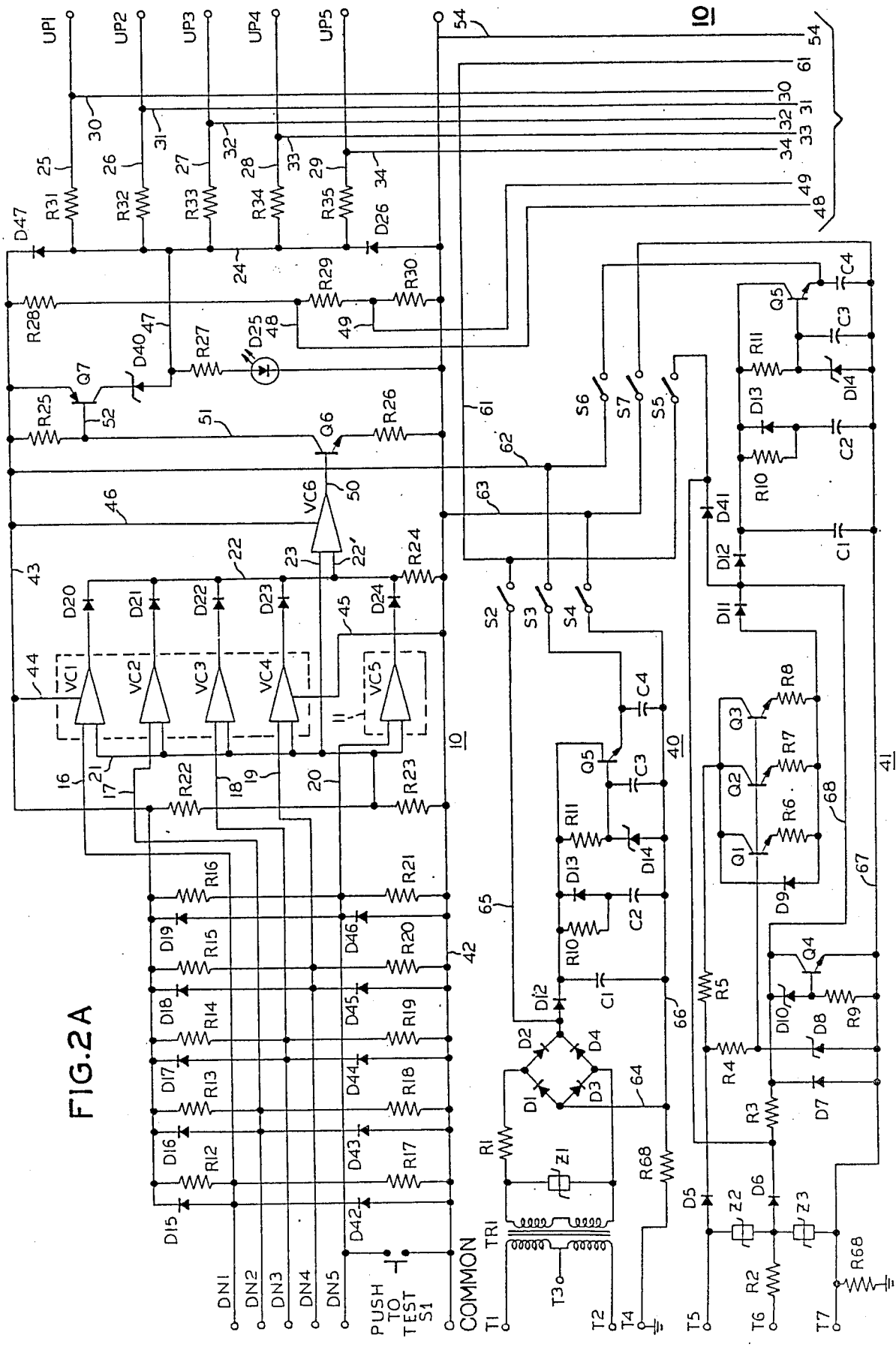
FIG. 2 is a diagramatic representation of the circuit elements employed within the block diagram of FIG. 1.
Figure 2B:
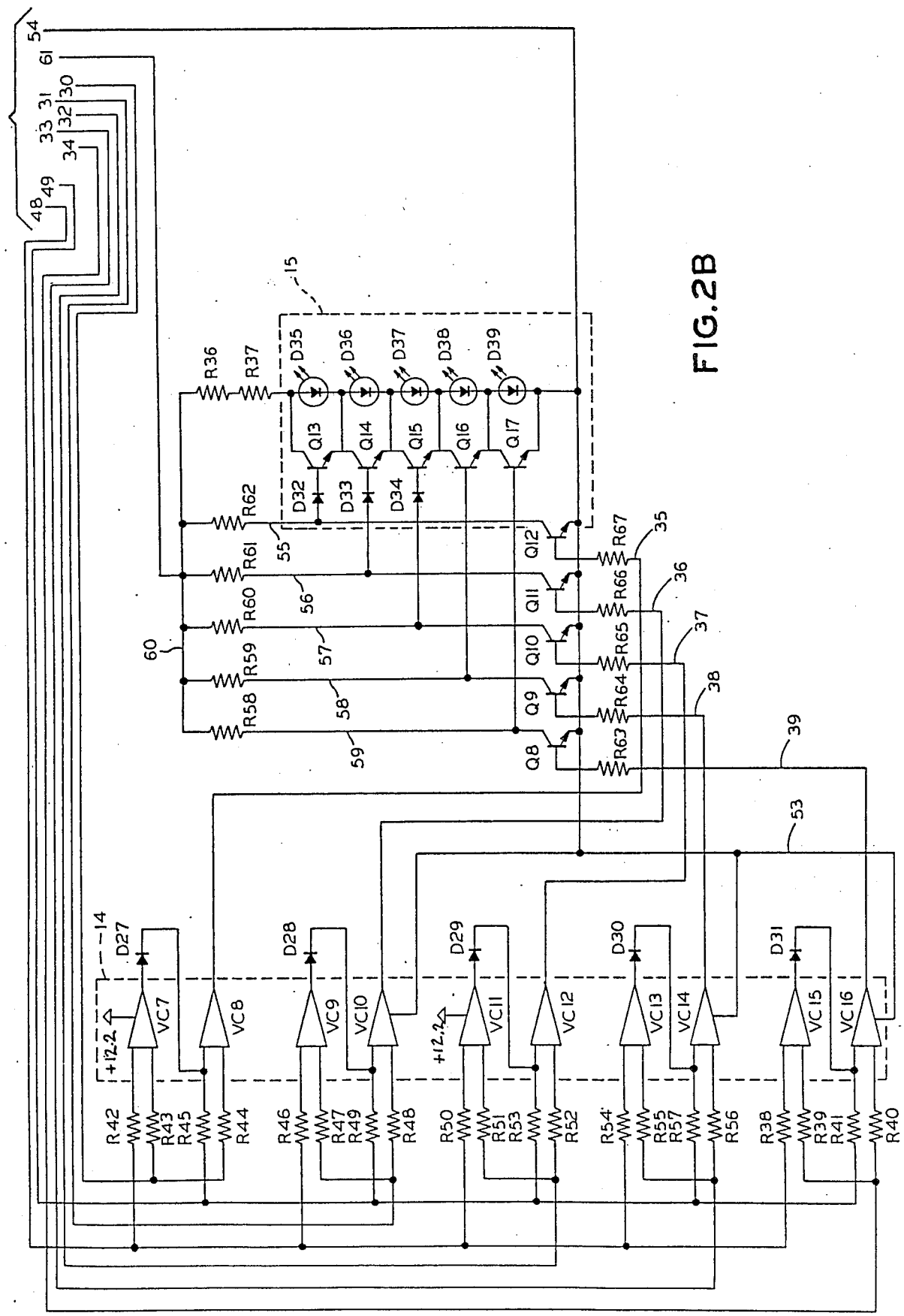

FIG. 2 shows the module circuit 10 of FIG. 1 in greater detail as follows. Downstream connections DN1-DN5 are maintained positive with respect to bus 42. Blocking diodes D15-D19 and D42-D46 and the voltage dividers provided by the resistors R12-R21 provide input voltages to VC1-VC5 as well as limiting the input voltage. Voltages dividing resistors R22, R23 provide a comparator reference of 5.3 VDC to common input connector 21. The output of VC1-VC5 are connected via diodes D20-D24 and common output connector 22 to input 22' of VC6 and a common reference input to VC6 is provided by lead 23 and common input connector 21. Connection between bus 43 and comparators VC1 and VC6 is made via leads 44 and 46 respectively. Connection between VC4 and bus 42 is made via lead 45. Common output connector 22 is connected with bus 42 through resistor R24. The electronic switch 12 of FIG. 1 consists of the combination of VC6, R25, R26 and transistors Q6 and Q7 which operate in the following manner. When a signal at the downstream terminals DN1-DN5 reduces the input voltage to comparators VC1-VC5 to a value below the comparator reference, the output of these comparators on common output connector 22 goes "high" resulting in a high at the output of VC6 and at the base of Q6 via lead 50 and the base of Q7 via the collector of Q6 and leads 51, 52. Q6' and Q7 turn on to enable an output voltage to occur across bus 42 and 47 and upstream terminals UP1-UP5 through buffer resistors R31-R35 as well as applying a voltage to light-emitting diode D25 through resistor R27 and zener diode D40. D25 is contained within the module functional element 13 depicted in FIG. 1 to show that the module circuit is operative, as described earlier. When the input to comparators VC1-VC5 is such that their output at common output connector 22 is low, VC6 provides a logic zero (output low) to the base of transistors Q6 and Q7 which tightly clamps the base of Q6 to bus 42 by base emitter connection through R26 to provide a stable offstate to Q6. The emitter of Q7 is directly connected to bus 43 and the base is connected through resistor R25. Diodes D26 and D47 clamp any transient voltages that might be induced on busses 42, 43 through the upstream terminals. Zener diode D40 ensures that the voltage at the upstream terminals is at least three volts less than the 12.2. VC supply voltage is to provide the necessary signal voltage to window detector circuit 14. The anode of D40 is connected via lead 47 to lead 24 which interconnects between busses 42 and 43 via aforementioned diodes D26 and D47. The cathode of D40 and collector of Q7 are connected together as shown. Connection between lead 24 and upstream terminals UP1-UP5 is made via buffer resistors R31-R35 and leads 25-29 respectively.

WINDOW DETECTORS

Window detectors 14 comprise a first pair of comparators VC7, VC8 connected with upstream terminal UP1 via lead 30; a second pair VC9, VC10 connected with UP2 via lead 31; a third pair VC11, VC12 connected with UP3 via lead 32; a fourth pair VC13, VC14 connected with UP4 via lead 33 and a fifth pair VC15, VC16 connected with UP5 via lead 34. A voltage divider consisting of resistors R28-R30 connecting between busses 43 and 42, provides a common reference to all the voltage comparators within the window detectors by means of common input leads 48, 49 and resistors R42, R45, R46, R49, R50, R53, R54, R57, R38 and R41. Signal input is provided to VC7 and VC8 through limiting resistors R43, R44 via lead 30. Signal input voltage is supplied to VC9, VC10 through R47. R48 via lead 31. Signal input voltage is provided to VC11, VC12, through R51, R52 via lead 32. Signal input voltage is provided to VC13, VC14 through R55, R56 via lead 33. Signal input voltage is provided to VC15, VC16 through R39, R40 via lead 34. All the comparator pairs within window 14 are interconnected in series in the following manner. The output of VC7 is connected to the comparator input of VC8 via diode D27. The output of VC9 is connected with the input of VC10 via D28. The output of VC11 is connected with the input to VC12 via D29. The output of VC13 is connected to the input of VC14 via D30 and the output of VC15 is connected with the input to VC16 via D31. Comparator pairs VC7, VC8 and VC11, VC12 are empowered by connection with a source of +12.2 VDC. Comparator pairs VC9, VC10, VC13, VC14, and VC15, VC16 are empowered by common connection through lead 53 and 54 back to bus 42. LED array 15 includes light-emitting diodes D35-D39 each respectively shunted by transistors Q13-Q17.

LED DISPLAY

The LED's are connected in series with dropping resistors R36, R37 through leads 60, 62 to AC power supply circuit 40 and DC power supply circuit 41 and through lead 54 to bus 42. Each of the shunting transistors Q13-Q17 is controlled by a corresponding open collector transistor Q8-Q12. The base of Q13 is connected through diode D32 and resistor R62 to common lead 60 back to power supply lead 61, and through transistor Q12 back to bus 42 through lead 54. The base of Q14 is connected through D33 and R61 to leads 60 and 61 and through Q11 to lead 54. The base of Q15 is connected through D34, lead 57 and resistor R60 to leads 60 and 61, and through Q10 to lead 54. The base of Q16 is connected through lead 58 and resistor R59 to leads 60 and 61 and through Q9 to lead 54. The base of Q17 is connected through lead 59 and resistor R58 to leads 60 and 61 and through Q8 to lead 54. The base of transistor Q8 is connected through resistor R63 and lead 39 to the output of VC16. The base of Q9 is connected through resistor R64 and lead 38 to the output of VC14. The base of Q10 is connected through resistor R65 and lead 37 to the output of VC12. The base of Q11 is connected through the resistor R66 and lead 36 to the output of VC10. The base of Q12 is connected through resistor R67 and lead 35 to the ouput of VC8. Shunt transistors Q13-17 remain "on" to shunt current from the LED's as long as no output occurs on comparators VC8, VC10, VC12, VC14 and VC16. When any of these comparators go "high", the corresponding transistor Q8-Q12 becomes turned on to remove the current from the corresponding shunting transistor Q13-Q17 allowing the corresponding LED, D35-D39 to become illuminated.

AC POWER SUPPLY

Both AC power and DC power can be simultaneously or alternatively provided to module circuit 10 by means of AC power supply circuit 40 through switches S2-S4 and by means of DC power supply 41 through switches S5-S7. Supply power is provided to LED display 15 by connection through lead 61 to AC power supply 40 by means of S2 and with DC power supply 41 by means of S5. Bus 43 is connected to the AC supply by means of lead 62 through S3 and with the DC supply through S6. Bus 42 is connected to the AC supply by means of lead 63 through S4 and with the DC supply through S7. The AC supply is energizd by connecting a source of 208/240 VAC across terminals T1, T2, of transformer TR1 or with 120 VAC connected across either terminal and center tap terminal T3. The output of TR1 is connected across varistor Z1 through series resistor R1 to the input of a bridge rectifier formed by diodes D1-D4. One output of the rectifier is connected through lead 64 and limiting resistor R68 to terminal T4 which is grounded, and through switch S4 and lead 63 to bus 42. The other output of the rectifier is connected by lead 65 and switch S2 to power supply lead 61, through diode D12, transistor Q5 and switch S3 to lead 62 and bus 43. Capacitor C1 connecting between the cathode of D12 and lead 66 filters the rectified DC wave form appearing across the output of the rectifier. A voltage regulator formed by the combination of R11, D14 and Q5 provides a 12.2 VDC regulated output across leads 62 and 63 when switches S3 and S4 are closed. Capacitors C3 and C4 provide additional filtering. An energy storage network formed by the combination of R10, D13 and C2 provides energy during momentary interruptions of power that might occur during a fault condition. C2 is the energy storage capacitor and becomes charged via R10. The values of R10 and C2 are selected so that in the event that C2 becomes shorted, power remains across C4 and only the energy storage feature is lost. Diode D12 blocks the filtered DC voltage stored across C1 and C2 from being utilized at S2 so that some energy is available to provide the interlocking function to the circuit should loss of input power occur simultaneously with the occurrence of a fault.

DC POWER SUPPLY

The DC power supply circuit 41 can be provided with either 125 VDC applied at T5 relative to ground at T7 or 48 VDC to applied at terminal T6. When 48 VDC input is applied across T6, T7, varistor Z3 provides a high level transient voltage clamp. D10, R9 and Q4 form a power zener circuit which operates in combination with dropping resistor R3 to limit the voltage across Q4 to a nominal peak value of 62.7 volts. R2 in series with T6 limits the current input to the circuit, and D6 in series with R2 protects against the inadvertant application of reversed DC power to the circuit. D7 is connected across leads 67, 68 to provide a reverse voltage clamp to prevent any reverse transients from occurring across Q4. D41 allows the full input voltage, less the diode drop across D6, to appear through switch S5 and lead 61 to light emitting diode array 15. The elements on the cathode side of D12 provide the same function as described earlier for AC power supply circuit 40 and common reference designations are employed for common elements. With 125 VDC applied across terminals T5, T7, the series combination of varistors Z2, Z3 provide transient voltage protection. Diode D5 protects against the application of reversed DC power in the manner described earlier for diode D6. Resistors R4–R8 in combination with transistors Q1–Q3 provide a regulated output voltage of approximately 46 VDC to the anode of D11. R5 is a series dropping resistor for limiting the dissipation in Q1–Q3. Emitter resistors R6–R8 ensure that the load current is shared equally and D9 is connected across the transistor-resistor voltage regulator circuit to provide a low voltage clamp for reverse transients across the transistors. Switches S6 and S7 provide for the connection of the output of the DC supply across busses 42, 43 in a similar manner as described earlier for S3 and S4.

Having described my invention, what I claim as new and desire to secure by Letters Patent is:

1. A zone selective interlock module for static trip circuit breakers comprising:
   a plurality of downstream terminals, each connecting with at least one of a plurality of downstream static trip circuit breakers for receiving a signal from said plurality of downstream static trip circuit breakers;
   means for determining whether said signal is indicative of a downstream fault condition; and
   a plurality of upstream terminals, each connecting with a different one of a plurality of upstream circuit breakers for transmitting a signal to said plurality of upstream static trip circuit breakers to indicate said fault occurrence.

2. The module of claim 1 wherein said fault determining means includes voltage comparison means.

3. The module of claim 1 including switching means connecting between said downstream signal means and said upstream signal means.

4. The module of claim 1 including test means for determining whether said module is operative.

5. The module of claim 4 further including display means for indicating occurrence of said fault condition.

6. The module of claim 2 including reference means for comparing with said voltage comparison means to determine when said downstream signal is less than a said predetermined reference.

7. The module of claim 3 wherein said switching means includes a voltage comparator having an input connected with said downstream terminals and an output connected with said upstream terminals.

8. The module of claim 3 wherein said switching means includes a normally open switch between one of said downstream terminals and an electric supply bus for clamping said one terminal to said bus when said switch is closed.

9. The module of claim 5 including window detector means.

10. The module of claim 9 wherein said window detector means comprising a plurality of voltage comparators connecting between said fault determining means and said display means for activating said display means upon the occurrence of said downstream fault.

11. The module of claim 10 wherein said voltage comparator comprises a plurality of pairs of amplifiers, the output of one of said pair being connected with the input of the other of said pair, the output of said other amplifier being connected with a corresponding light emitting diode within said display means through a transistor switch.

12. The module of claim 11 wherein said transistor switch comprises a first and second transistor, said first transistor being connected in shunt across said light emitting diode and said second transistor being connected to the base of said first transistor.

13. The module of claim 12 wherein the base of said second transistor is connected to the output of said other amplifier, whereby said second transistor is turned on when said other amplifier is enabled and whereby said first shunting transistor is turned off to allow said light emitting diode to become illuminated.

14. The module of claim 13 wherein said voltage comparators activate said display means when said test means is activated.

15. The module of claim 14 wherein said display means becomes activated when an impedance range of from 300 to 700 ohms exists between said module and any of said upstream breakers.

* * * * *